No. 784,731. PATENTED MAR. 14, 1905.
J. H. BLEOO.
VALVE FOR REGULATING PRESSURE.
APPLICATION FILED APR. 4, 1904.
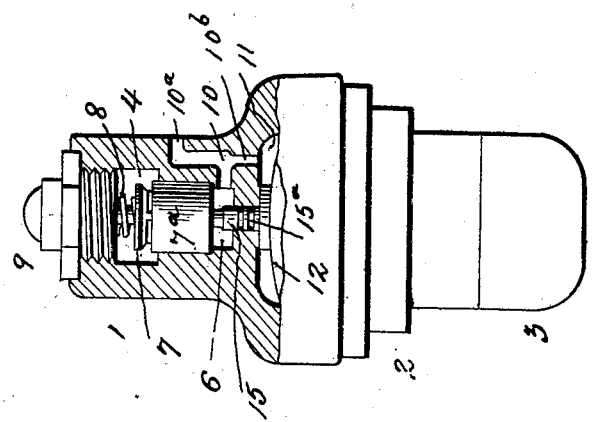
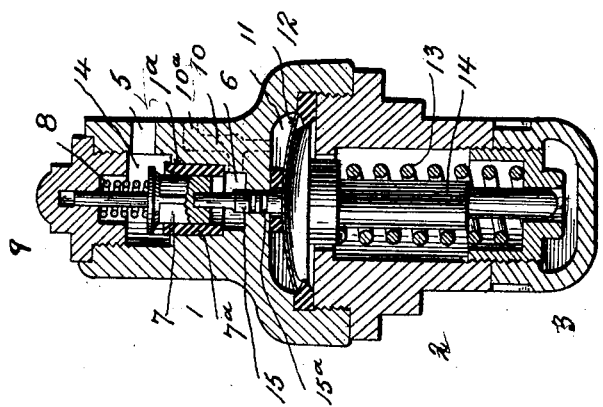

No. 784,731.

Patented March 14, 1905.

UNITED STATES PATENT OFFICE.

JOHN H. BLEOO, OF NEW YORK, N. Y., ASSIGNOR TO ABRAHAM B. LEVY, OF NEW YORK, N. Y.

VALVE FOR REGULATING PRESSURE.

SPECIFICATION forming part of Letters Patent No. 784,731, dated March 14, 1905.

Original application filed January 9, 1904, Serial No. 188,293. Divided and this application filed April 4, 1904. Serial No. 201,382.

*To all whom it may concern:*

Be it known that I, JOHN H. BLEOO, a citizen of the United States, residing in New York city, borough of Brooklyn, New York, have invented certain new and useful Improvements in Valves for Regulating Pressure, of which the following is a specification.

This application is a division of my application filed January 9, 1904, Serial No. 188,293, for improvements in valves for airbrake systems; and the present invention relates to a valve adapted to regulate the flow of fluid under pressure from a source of supply being arranged to be controlled through the medium of varying pressure in the receiving pipe or receptacle connected with the exhaust of the valve.

The invention comprises the novel details of improvement that will be more fully hereinafter set forth and then pointed out in the claims.

Reference is to be had to the accompanying drawings, forming part hereof, wherein—

Figure 1 is a central sectional view of a valve embodying my invention, and Fig. 2 is a partly-sectional side elevation thereof.

In the accompanying drawings the numerals 1 2 3 indicate the members of the casing of the valve.

At 4 is a chamber in member 1, that communicates, by a passage 5, with a supply source, such as a reservoir containing fluid under pressure, (the reservoir not being shown,) and at 6 is a chamber shown in the member 1 and in communication with chamber 4 by a passage $1^a$, controlled by a valve 7.

The valve 7 is shown guided in a bushing $7^a$ in the passage $1^a$, and the valve 7, as shown, is adapted to fit upon a seat on said bushing. A spring 8, shown located between valve 7 and the cap 9, serves to press the valve to its seat.

The chamber 6 communicates with a passage 10 in the member 1, which passage at its port $10^a$ is adapted to be connected with a pipe or other receptacle to receive fluid from the valve. The fluid from the chamber 6 also communicates with a diaphragm-chamber 11, (shown between the members 1 2,) as by a relatively small port $10^b$. The diaphragm 12, forming one wall of chamber 11, is normally pressed upwardly by a spring 13, shown provided with a plunger 14, bearing against said diaphragm. The spring 13 acts to press diaphragm 12 against the fluid-pressure in chamber 11, and pressure in said chamber acts to counterbalance the upward pressure of said spring against the diaphragm until the pressure in the pipe or chamber connected with the port $10^a$ reaches a predetermined point below the main pressure in chamber 4.

At 15 is indicated a pin guided to travel freely in a bearing in member 1, and said pin is adapted to bear at one end against valve 7 and at the other end against diaphragm 12, whereby spring 13 serves through said pin to normally raise valve 7 from its seat against the downward pressure of spring 8, bearing on said valve. In the arrangement shown the pin 15 is fitted very closely in the guide or bearing, having two or more circumferential friction-grooves $15^a$, which receive fluid, and thus serve as packing-rings in well-known manner and practically prevent the flow of fluid through the bearing or guide past such pin and yet serve to hold the pin in positions to which it may be pushed. Pin 15 is not fastened to either the valve 7 or diaphragm 12 and is a little shorter than the distance from said valve to the diaphragm at the time that valve 7 is on its seat and the air-pressure has moved the diaphragm to its full downward travel, and by means of the friction-grooves and the fluid therein and the equalized pressure in chambers 6 and 11 the pin 15 will remain suspended or in positions set until forced up by the diaphragm 12 or down by the feed-valve 7. The pin 15 may be loosely guided in a socket in the valve 7, so that the space above the pin will be open to the air from chamber 6.

The operation of the above-described valve is as follows: When fluid is caused to pass through passage 5 into chamber 4, it will pass valve 7 (which is now held up by spring 13) into chamber 6 and will pass thence through passage 10 to the pipe or cylinder connected therewith and also into chamber 11 upon diaphragm 12. Valve 7 in Fig. 1 is shown in the position it assumes when pushed up by spring 13 and pin 15. When the pressure in chamber 11 and the pipe or cylinder connected therewith has reached a predetermined point, (say seventy pounds to the square inch,) the regulating-piston 14 will be forced downward against spring 13 by the pressure in chamber 11, thus allowing pin 15 to be forced downward by feed-valve 7 by reason of an excess pressure of fluid in feed-valve chamber 4 received from the reservoir connected therewith, thus seating valve 7 and cutting off further pressure or flow from the main reservoir or other source to the pipe or cylinder connected with port $10^a$. As pressure in chambers 6 and 11 is thus maintained at or about the pressure desired and as chamber 11 has one small inlet and no outlet, the rise and fall of diaphragm 12 is positive with respect to the rise and fall of pressure in the pipe connected with port $10^a$, the regulating-spring 13 being a constant. When the pressure next falls in the passage 10 by reason of the rise or drawing away of the fluid for any desired service, the feed-valve 7 will rise from its seat by reason of the pressure of spring 13 against the diaphragm and the reduction of pressure in chamber 11, and when valve 7 thus rises from its seat, say, one-sixteenth of an inch it will give a relatively large area of opening, whereby pressure in passage 10 and the pipe and cylinder connected therewith will be quickly restored and then valve 7 will be closed by the excess pressure from the main fluid supply or reservoir upon its top and by reason of the descent of the diaphragm caused by the increase of pressure in chamber 11. By the means described the desired pressure in the pipe or cylinder connected with the passage 10 can be maintained from a fluid reservoir or supply having a normally greater pressure The valve above described may be used in connection with the main air-reservoir of an air-brake system, to be connected with the passage 5, the port $10^a$ to be connected with a train-pipe of such system; but the valve may also be used for supplying air or other gases to a receiver from a main supply source or reservoir having a pressure normally greater than that desired in the receiver.

Having now described my invention, what I claim is—

1. A feed-valve casing provided with two chambers, a valve to control the flow of fluid from one chamber to the other, a diaphragm on one side of one of said chambers, and a pin between the valve and diaphragm fitting closely in bearings to prevent the flow of fluid past the pin, said pin being provided with a friction-groove within such bearing to receive fluid to serve in maintaining the pin in positions in which it may be placed by the diaphragm or feed-valve, substantially as described.

2. A feed-valve casing provided with three chambers, a valve to control the flow of fluid from one chamber to the other, two chambers being in communication through a port, a diaphragm on one side of one of said chambers, and a pin interposed between the diaphragm and said valve, said pin being of such length between the diaphragm and the part of the valve opposed to said pin as to permit independent movement of the parts relative to each other, substantially as described.

3. A feed-valve casing provided with a plurality of chambers, a valve to control the flow of fluid from one chamber to the other, a diaphragm on one side of one chamber, and a pin interposed between said valve and diaphragm and movable independently thereof, said pin having means to cause it to remain in the position to which it is moved by the diaphragm after the diaphragm has been forced away from the pin by the increased pressure in the diaphragm-chamber, substantially as described.

4. In a valve provided with chambers, a friction-pin entering two chambers on opposite sides of its bearing and having both ends in communication with the same fluid, and a valve movable independently of said pin and adapted to move the pin through the influence of main fluid-pressure, substantially as described.

5. A valve-casing provided with a plurality of chambers, a valve to control the flow of fluid from one chamber to another, a diaphragm on one side of one chamber, the last-named chamber being in communication with the chamber receiving fluid from said valve, a spring to operate said diaphragm, and a pin interposed between said valve and diaphragm for opening the valve by the diaphragm, said pin having a friction-groove to receive fluid to serve in holding the pin in set positions, substantially as described.

JOHN H. BLEOO.

Witnesses:
MAURICE BLOCK,
HENRY STORCK.